(12) United States Patent
Sawyers-Abbott et al.

(10) Patent No.: US 10,294,892 B2
(45) Date of Patent: May 21, 2019

(54) BLOCKER DOOR LINK ARM AND FITTING

(71) Applicant: United Technologies Corporation, Hartford, CT (US)

(72) Inventors: Nigel David Sawyers-Abbott, South Glastonbury, CT (US); Priscilla Chin, Newington, CT (US)

(73) Assignee: United Technologies Corporation, Farmington, CT (US)

( * ) Notice: Subject to any disclaimer, the term of this patent is extended or adjusted under 35 U.S.C. 154(b) by 534 days.

(21) Appl. No.: 15/131,955

(22) Filed: Apr. 18, 2016

(65) Prior Publication Data

US 2017/0298871 A1    Oct. 19, 2017

(51) Int. Cl.
| | |
|---|---|
| *F02K 1/76* | (2006.01) |
| *F01D 25/24* | (2006.01) |
| *F02K 1/62* | (2006.01) |
| *F02K 1/72* | (2006.01) |
| *F02K 1/80* | (2006.01) |

(52) U.S. Cl.
CPC ............. *F02K 1/763* (2013.01); *F01D 25/24* (2013.01); *F02K 1/625* (2013.01); *F02K 1/72* (2013.01); *F02K 1/766* (2013.01); *F02K 1/80* (2013.01); *F05D 2220/32* (2013.01); *F05D 2260/30* (2013.01); *Y02T 50/672* (2013.01)

(58) Field of Classification Search
CPC ......... B64D 29/06; B64D 27/10; F02K 1/625; F02K 1/70; F02K 1/72; F02K 1/763; F05D 2260/31; F05D 2220/32; F16C 11/045; F16C 11/0619; F01D 25/24

USPC ....................................................... 60/226.2
See application file for complete search history.

(56) References Cited

U.S. PATENT DOCUMENTS

| | | |
|---|---|---|
| 4,605,186 A | 8/1986 | Fernz |
| 2010/0270428 A1 | 10/2010 | Murphy |
| 2013/0219857 A1 | 8/2013 | Zysman |
| 2015/0308381 A1* | 10/2015 | Byrne ................. F02K 1/763 60/226.2 |

FOREIGN PATENT DOCUMENTS

EP    2857666    4/2015

OTHER PUBLICATIONS

EP Search Report dated Sep. 4, 2017 in EP Application No. 17166915.3.

* cited by examiner

*Primary Examiner* — Thai Ba Trieu
*Assistant Examiner* — Loren C Edwards
(74) *Attorney, Agent, or Firm* — Snell & Wilmer, L.L.P.

(57) ABSTRACT

Systems for thrust reverser link arm connections are described herein. A fitting for a thrust reverser link arm may comprise a base plate configured to be fastened to a proximal surface of an inner fixed structure (IFS), a first wall extending orthogonally from the base plate, a pin extending orthogonally from the first wall, a second wall extending orthogonally from the base plate, a removable member, a first column located between the first wall and the second wall, and a second column located between the first wall and the second wall. The removable member may surround at least a portion of the pin. The removable member may be removed from a radially outward side of the IFS.

15 Claims, 8 Drawing Sheets

BLOCKER DOOR LINK ARM AND FITTING

FIELD

This disclosure relates generally to gas turbine engines, and more particularly to thrust reverser assemblies for gas turbine engines.

BACKGROUND

Generally, a thrust reverser blocker door link arm attaches to a fan duct inner fixed structure (IFS) via a fitting attached to the surface of the IFS. The thrust reverser blocker door may rotate about the fitting to a deployed position, blocking fan duct air and causing reverse thrust. These features (i.e., the fitting and the link arm) may cause duct losses and may reduce the thrust specific fuel consumption (TSFC).

SUMMARY

A nacelle for a gas turbine engine may comprise an inner fixed structure (IFS), and a fitting for a link arm, the fitting being attached to a proximal surface of the IFS. The fitting may comprise a pin, wherein the link arm pivotally rotates about the pin, and a removable member for preventing the link arm from detaching from the pin, the removable member being removably accessible from a radially outward side of the IFS.

In various embodiments, the fitting may be attached to the proximal surface of the IFS via a plurality of fasteners. The link arm may comprise a thrust reverser link arm, the removable member being removable from the fitting in response to a thrust reverser being in a closed position. The pin may comprise a centerline axis, the removable member preventing the link arm from moving along the centerline axis with respect to the pin. The fitting may further comprise a base plate for attaching the fitting to the IFS, a first supporting wall extending orthogonal from the base plate, and a second supporting wall extending orthogonal from the base plate. The pin may be coupled to the first supporting wall. The removable member may be in contact with the second supporting wall in response to the removable member being in an installed position. The fitting may further comprise a first column, and a second column, wherein the removable member is attached to the first column via a first fastener and attached to the second column via a second fastener. The link arm may be located between the first supporting wall and the removable member in response to the link arm being in an installed position and the removable member being in the installed position. The plurality of fasteners may extend in a direction orthogonal to the first fastener and the second fastener.

A fitting for a thrust reverser link arm may comprise a base plate configured to be fastened to a proximal surface of an inner fixed structure, a first wall extending orthogonally from the base plate, a pin extending orthogonally from the first wall, a second wall extending orthogonally from the base plate, a removable member, a first column located between the first wall and the second wall, and a second column located between the first wall and the second wall.

In various embodiments, the removable member may surround at least a portion of the pin in response to the removable member being in an installed position. The removable member may be attached to the second wall and the first column via a first fastener, the removable member located between the second wall and the first column, and wherein the removable member is attached to the second wall and the second column via a second fastener, the removable member located between the second wall and the second column. A first aperture may be disposed in the first column for receiving the first fastener. A second aperture may be disposed in the second column for receiving the second fastener.

A nacelle arrangement may comprise an inner fixed structure (IFS), a thrust reverser blocker door, a thrust reverser link arm coupled to the thrust reverser blocker door, a fitting coupled to the thrust reverser link arm, the fitting being attached to a proximal surface of the IFS, the fitting comprising a base plate fastened to the proximal surface of the IFS, a first wall extending orthogonally from the base plate in a distal direction, a pin extending orthogonally from the first wall, the pin comprising a first end coupled to the first wall and a second end, and a removable member surrounding at least a portion of the second end of the pin, the removable member configured to transfer a load from the pin into the IFS in response to the thrust reverser blocker door being deployed, the removable member being removable from a radially outward side of the IFS.

In various embodiments, a first end of the thrust reverser link arm may be rotatably coupled to the fitting and a second end of the thrust reverser link arm is coupled to the thrust reverser blocker door. The removable member may surround a distal/aft half of the pin. At least a portion of the load may be transferred from the thrust reverser link arm, into the pin, into at least one of the removable member and the first wall, into the base plate, and into the IFS. The fitting may further comprise a second wall extending orthogonally from the base plate, the removable member being removably attached to the second wall via at least one fastener. The fitting may further comprise a first column located between the first wall and the second wall, and a second column located between the first wall and the second wall, wherein the removable member is removably attached to the first column and the second column via the at least one fastener.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
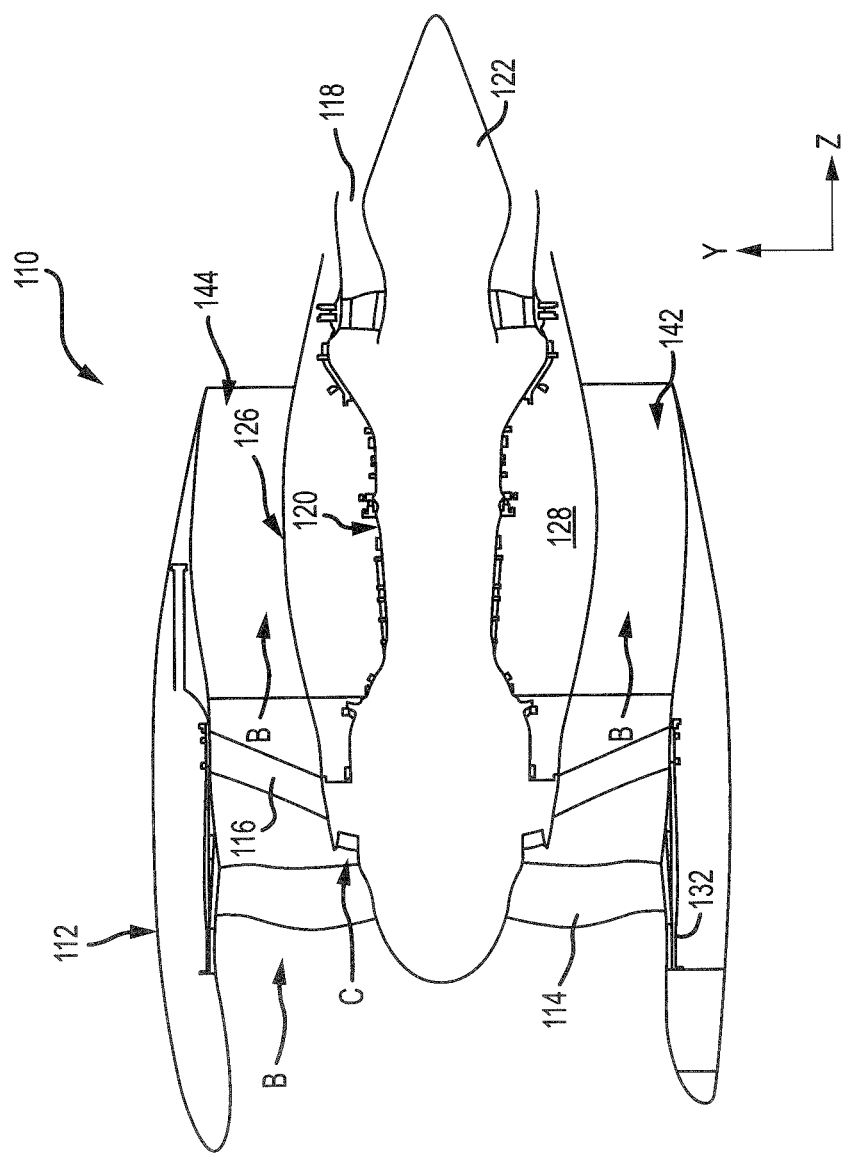
FIG. 1 illustrates a gas turbine engine, in accordance with various embodiments.

FIG. 1 illustrates a schematic view of a gas turbine engine, in accordance with various embodiments. An xyz-axis is provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Nacelle 112 typically comprises two halves which are typically mounted to a pylon. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example.

Figure 2A:
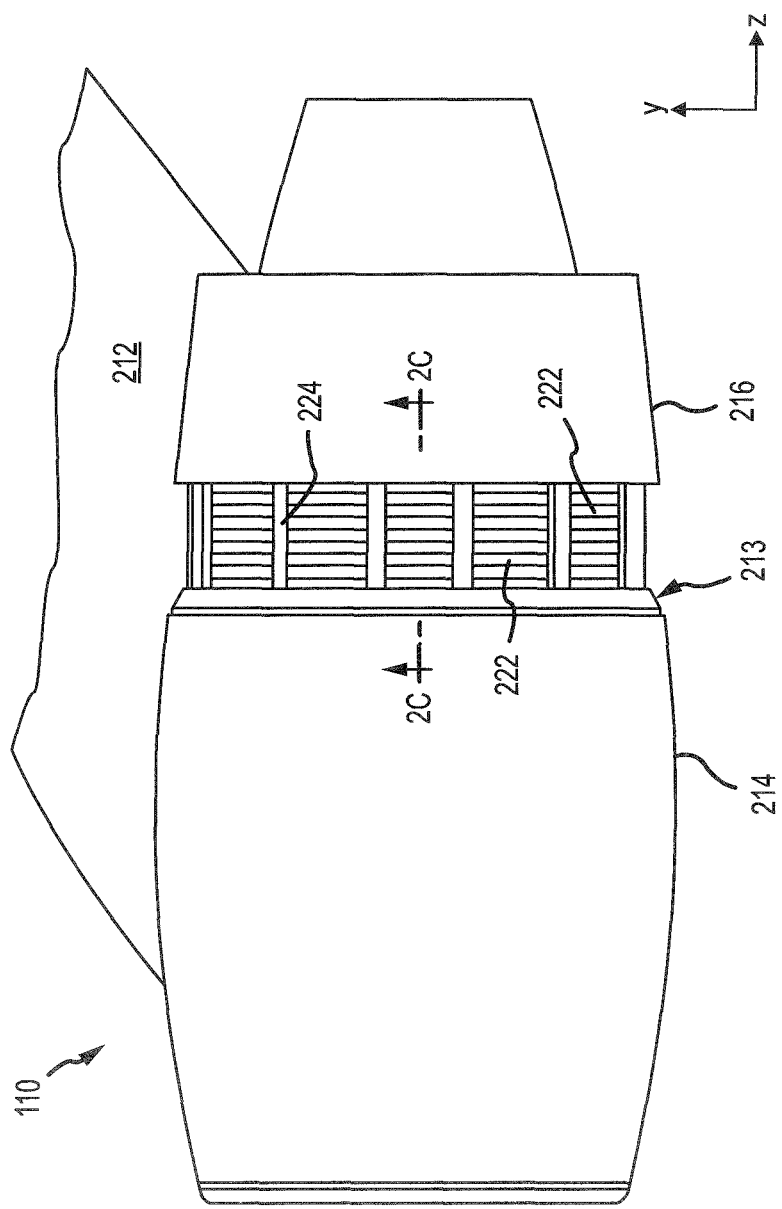
FIG. 2A illustrates a side view of a gas turbine engine, in accordance with various embodiments.

With reference to FIG. 2A, a side view of gas turbine engine 110 is illustrated, in accordance with various embodiments. Gas turbine engine 110 may comprise a turbofan engine. Gas turbine engine 110 may be mounted onto an aircraft by pylon 212. Gas turbine engine 110 may include segmented cowl 213 which includes nacelle body 214 and translating cowl 216 and IFS 126 (see FIG. 1). Translating cowl 216 is split from nacelle body 214 and translates aft to produce reverse thrust.

A plurality of cascade vane sets 222 may be uncovered in response to translating cowl 216 being translated aft as seen in FIG. 2A. Each of cascade vane sets 222 may include a plurality of conventional transverse, curved, turning vanes which turn airflow passing out from bypass flow path B (see FIG. 1) through the cascade sets in an outwardly and forwardly direction relative to gas turbine engine 110. Islands 224 are provided between cascade vane sets 222 to support the translation of translating cowl 216 and support the sides of cascade vane sets 222. In the stowed position, translating cowl 216 is translated forwardly to cover cascade vane sets 222 and provide a smooth, streamlined surface for air flow during normal flight operations.

Figure 2B:
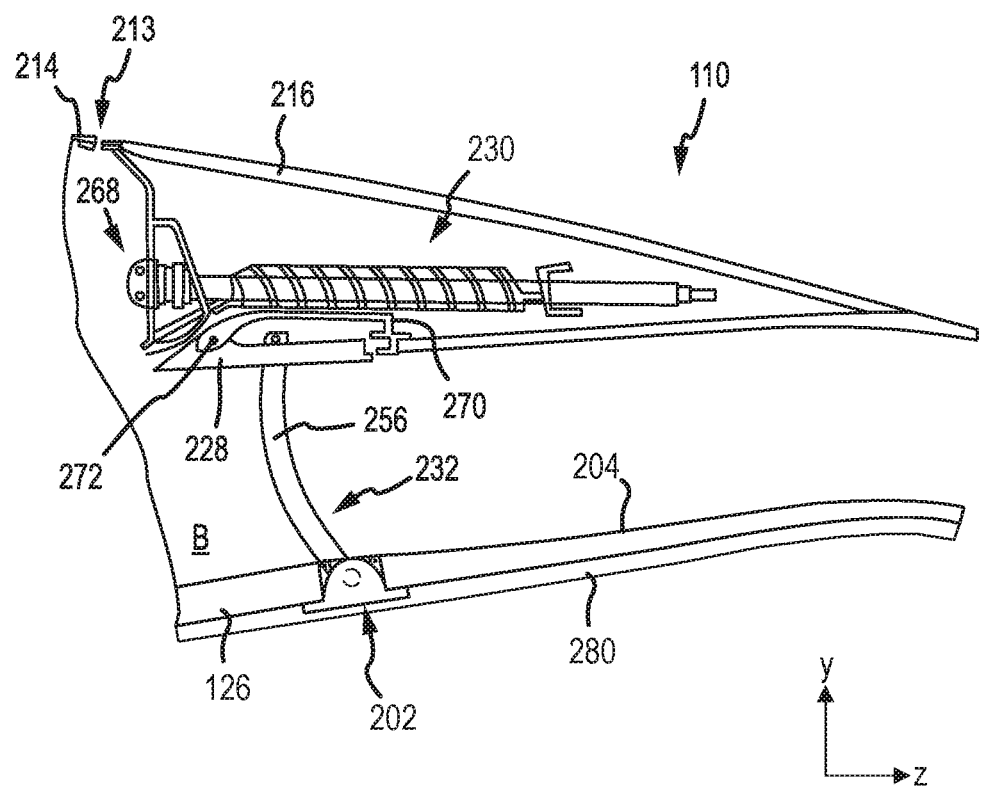
FIG. 2B illustrates a cross-section view of gas turbine engine with a blocker door in a stowed position, in accordance with various embodiments.

With reference to FIG. 2B, a cross-section view of gas turbine engine 110 with blocker door 228 in a stowed position is illustrated, in accordance with various embodiments. Cascade 230 shown in FIG. 2B is just one of many cascade vane sets 222 disposed circumferentially around gas turbine engine 110 as shown in FIG. 2A. An actuator 268 may be disposed between these sets of cascades in order to drive translating cowl 216 rearward. After a thrust reversing operation is completed, actuators 268 may return blocker door 228 to the stowed position. Actuator 268 can be a ball-screw actuator, hydraulic actuator, or any other actuator known in the art. In various embodiments, multiple actuators 268 are spaced around gas turbine engine 110 in between cascade vane sets 222. Although illustrated in FIG. 2B and FIG. 2C as being radially in-line with cascade 230, actuator 268 may be located radially inward, radially outward, or in any location relative to cascade 230.

Blocker door (also referred to herein as thrust reverser blocker door) 228 may be engaged with translating cowl 216. In various embodiments, blocker door 228 may be engaged with translating cowl 216 through bracket means 270. In various embodiments, bracket means 270 and translating cowl 216 may comprise a single, unitary member. Pivot 272 may be a hinge attachment between blocker door 228 and bracket means 270. In various embodiments, blocker door 228 may be engaged directly to translating cowl 216 through a hinge attachment. Pivot 272 may allow blocker door 228 to rotate as translating cowl 216 moves from a stowed position to a deployed position.

A linkage system 232 may be coupled between IFS 126 and blocker door 228. Linkage system 232 may include fitting arrangement (also referred to herein as fitting) 202 and link (also referred to herein as a link arm, or a thrust reverser link arm) 256. Fitting 202 may be coupled to IFS 126. Link 256 may be configured to pivot about fitting 202. Stated another way, first end 252 of link 256 may be rotatably coupled to fitting 202. Second end 254 of link 256 may be rotatably coupled to blocker door 228.

In various embodiments, a thermal layer 280 may be installed onto a proximal side of IFS 126. Thermal layer may comprise a thermal protection to IFS 126 from components located radially inward from thermal layer 280. Thermal layer 280 may cover fitting 202 after being installed. Thus, fitting 202 may be installed onto IFS 126 before installing thermal layer 280.

Fitting 202 may extend through an aperture disposed in IFS 126 such that fitting 202 does not extend into bypass flow-path B, allowing a more efficient flow of bypass air in bypass flow-path B. Stated another way, fitting 202 may be located such that fitting 202 does not extend radially outward of distal surface (also referred to herein as flow surface) 204 of IFS 126. In this manner, the thrust specific fuel consumption (TSFC) of the gas turbine engine onto which fitting 202 is installed may be increased, in accordance with various embodiments.

Figure 2C:
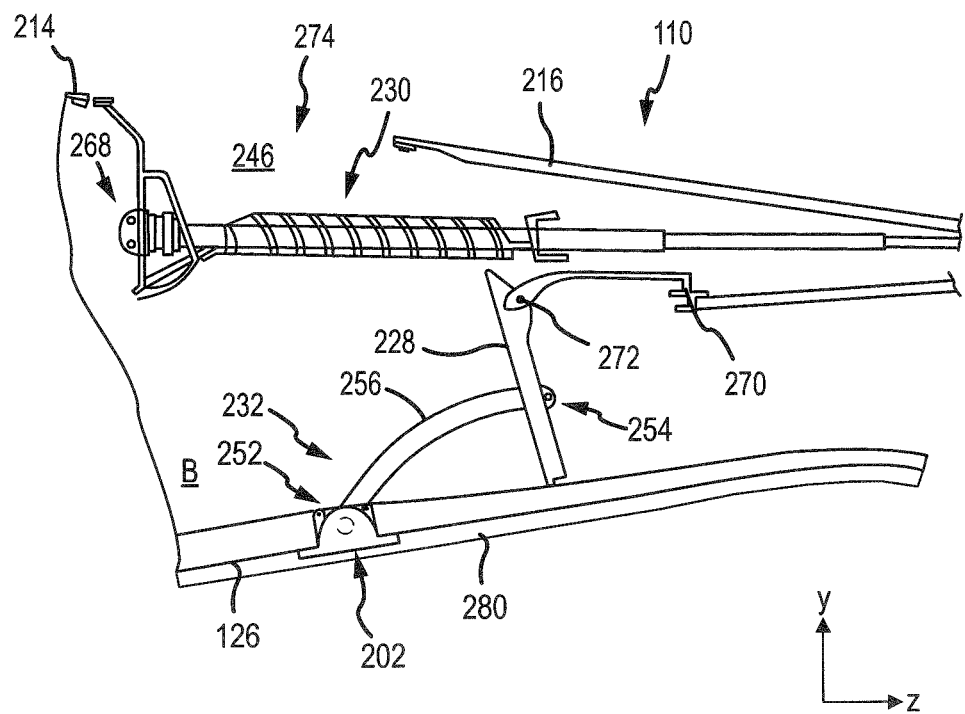
FIG. 2C illustrates a cross-section view of gas turbine engine with a blocker door in a deployed position, in accordance with various embodiments.

With respect to FIG. 2C, elements with like element numbering, as depicted in FIG. 2B, are intended to be the same and will not necessarily be repeated for the sake of clarity.

With reference to FIG. 2C, a cross-section view of gas turbine engine 110 with blocker door 228 in a deployed position is illustrated, in accordance with various embodiments. Thus, FIG. 2C shows gas turbine engine 110 in a reverse thrust mode. Blocker door 228 and its associated linkage system 232 may be deployed in response to translation of translating cowl 216 during a thrust reversing sequence. As noted above and with momentary additional reference to FIG. 1 FIG. 2B shows a normal or cruise mode where fan air is directed through bypass flow path B. When in reverse thrust mode or deployed position, shown in FIG. 2C, bypass flow path B is blocked by a ring of blocker doors 228, interposed within bypass flow path B and collectively having a complementary geometric configuration with respect thereto, for diversion of fan air into bypass duct 246. The reverse thrust mode is achieved by aft or rearward movement of translating cowl 216 thereby exposing outlet port 274 for airflow to escape through after the air passes into bypass duct 246.

Figure 3:
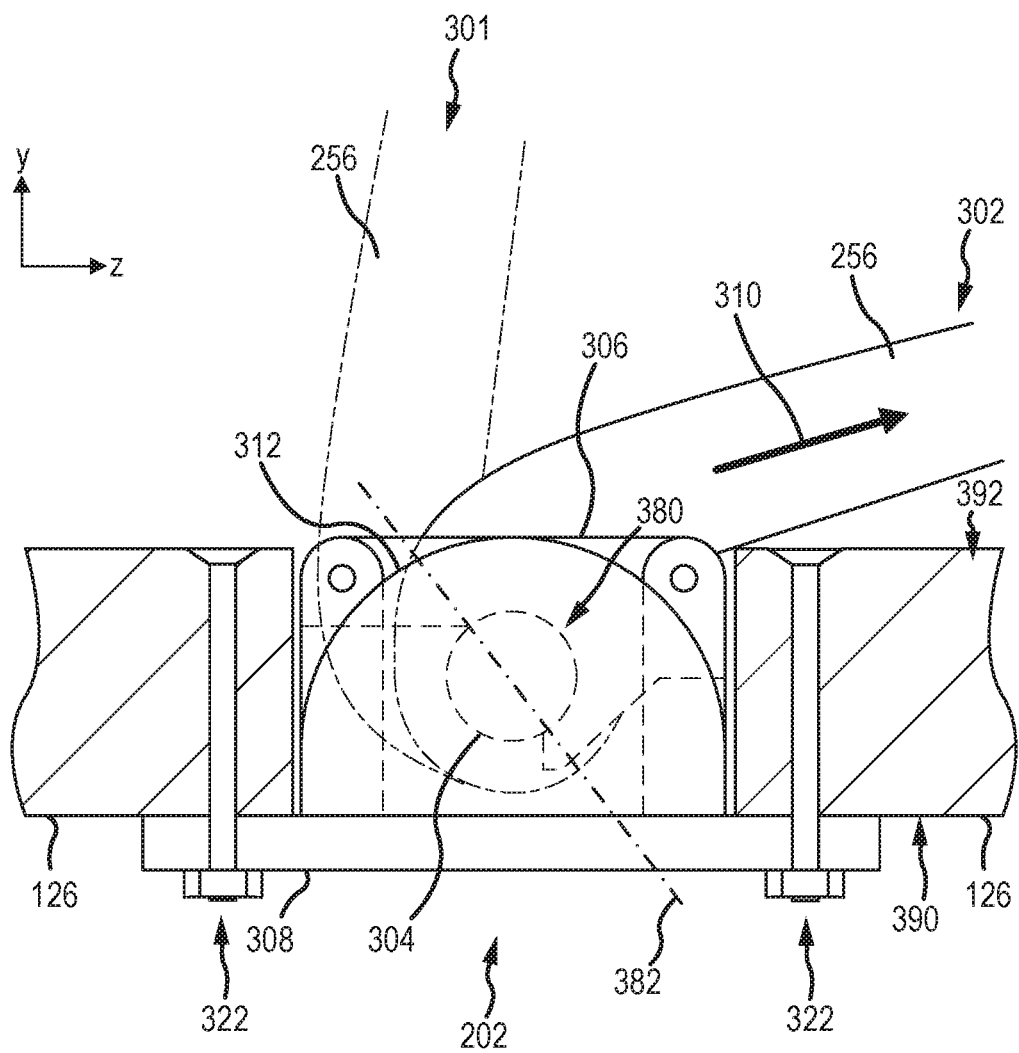
FIG. 3 illustrates a close-up, cross-sectional view of a fitting coupled to a link in both a normal cruise mode and a reverse thrust mode, in accordance with various embodiments.

With reference to FIG. 3, a close-up, cross-sectional view of fitting 202 coupled to link 256 in both a normal cruise mode 301 and a reverse thrust mode 302 is illustrated, in accordance with various embodiments. A yz-axes is provided for ease of illustration. Fitting 202 may include pin 304, removable member 306, base plate 308, and wall (also referred to herein as first wall or a first supporting wall) 312. Removable member 306 may be for preventing link 256 from detaching from pin 304. Link 256 may rotate about pin 304 in the clockwise direction when moving from the normal cruise mode 301 to the reverse thrust mode 302, as shown in FIG. 3. Thus, link 256 may pivotally rotate about pin 304.

In various embodiments, removable member 306 may be for supporting pin 304. Removable member 306 may surround at least a portion of pin 304. Removable member 306 may perimetrically surround distal/aft half 380 of pin 304. Distal/aft half 380 may be the half of pin 304 located aft and distal from imaginary line 382 as illustrated in FIG. 3. Link 256 may experience load 310 when in the reverse thrust mode 302 as compared to normal cruise mode, or position, 301. Load 310 may comprise a high load. Load 310 may be mostly in the aft direction (z-direction). With momentary reference to FIG. 2C, load 310 may be from air in bypass flow path B pushing against thrust reverser blocker door 228. Thus, in various embodiments, load 310 may be transferred from link 256, into pin 304, into removable member 306, into base plate 308, and into IFS 126. In various embodiments, load 310 may be transferred from link 256, into pin 304, into first wall 312, into base plate 308, and into IFS 126. Thus, removable member 306 may be configured to transfer a load from pin 304 into IFS 126 in response to blocker door 228 being deployed.

IFS 126 may comprise a proximal surface 390 and a distal surface 392. Base plate 308 may be attached to proximal surface 390 of IFS 126. Base plate 308 may be attached to proximal surface 390 of IFS 126 via a plurality of fasteners 322. Thus, fitting 202 may be installed onto IFS 126 from the radially inward side of IFS 126.

Figure 4A:
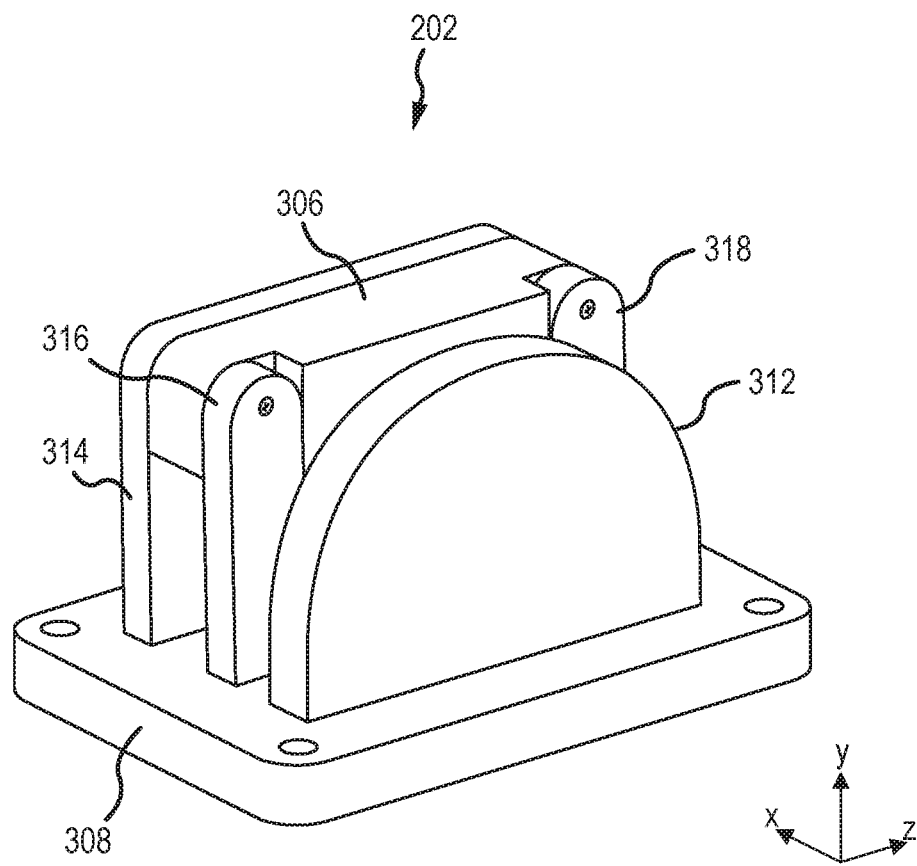
FIG. 4A illustrates a perspective view of a fitting, in accordance with various embodiments.
Figure 4B:
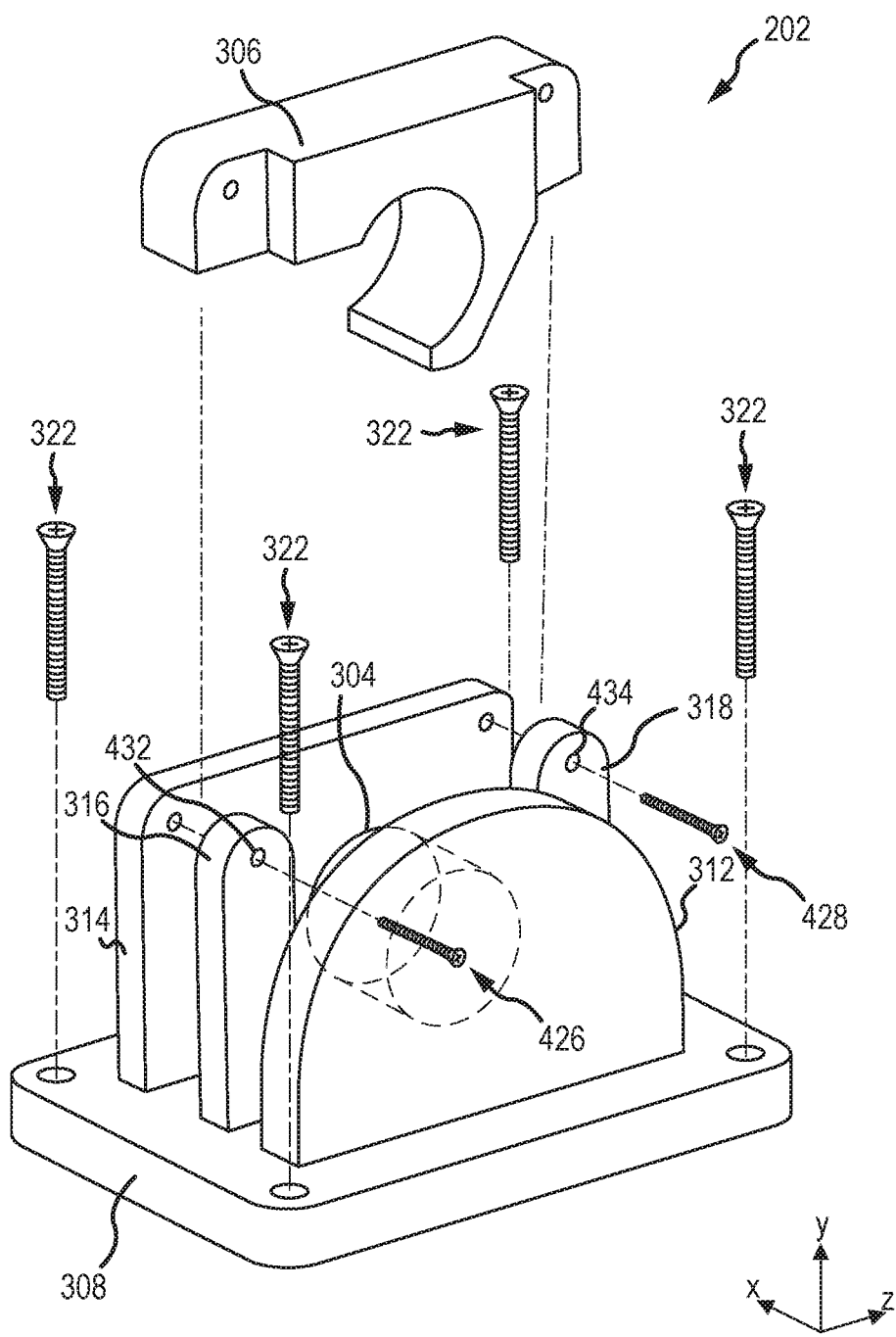
FIG. 4B illustrates an exploded view of a fitting, in accordance with various embodiments.
Figure 4C:
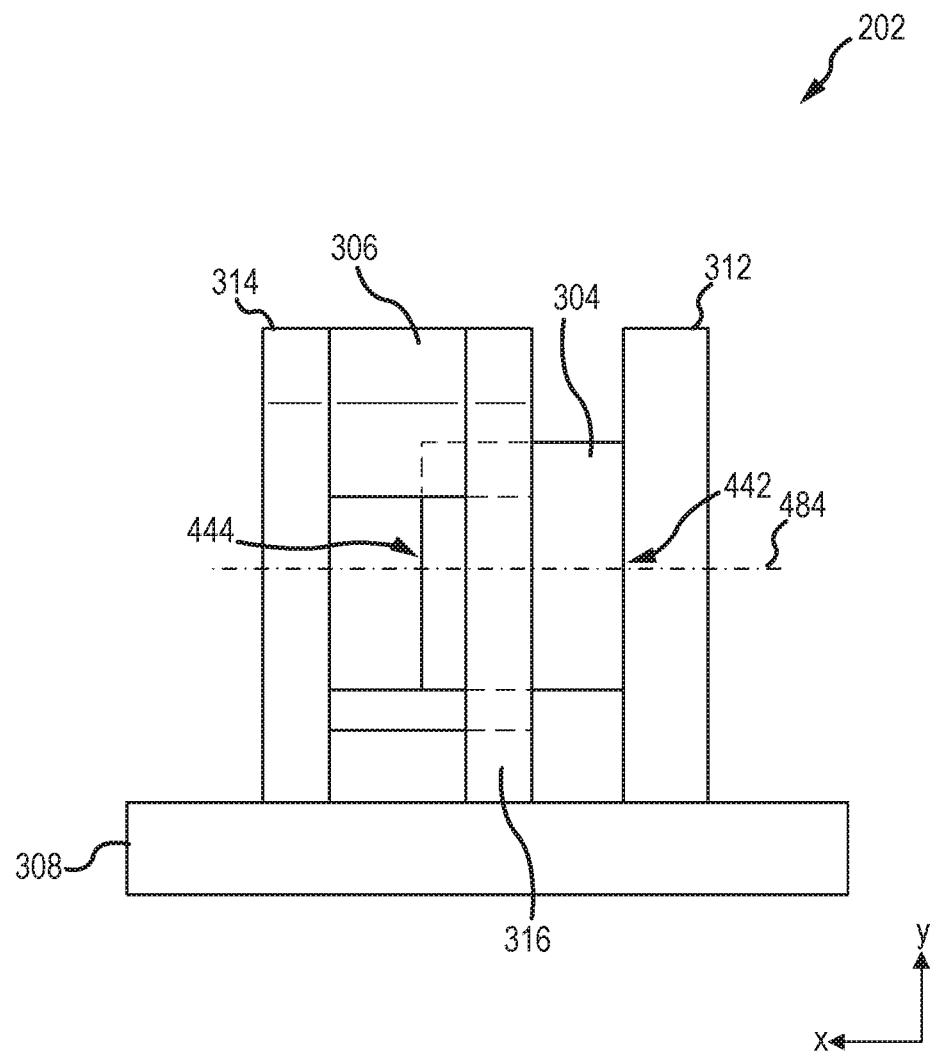
FIG. 4C illustrates a front view of a fitting, in accordance with various embodiments.

With respect to FIG. 4A, FIG. 4B, and FIG. 4C, elements with like element numbering, as depicted in FIG. 3, are intended to be the same and will not necessarily be repeated for the sake of clarity.

With reference to FIG. 4A, a perspective view of fitting 202 is illustrated, in accordance with various embodiments. An xyz-axes is provided for ease of illustration. In various embodiments, first wall 312 may extend orthogonally from base plate 308. When in an installed position, as illustrated in FIG. 3, first wall 312 may extend in a radially outward or distal direction (y-direction). Fitting 202 may include second wall 314. Fitting 202 may include first column 316 and second column 318. Second wall 314, first column 316, and second column 318 may extend radially outward from base plate 308, in a manner similar to first wall 312. Removable member 306 is illustrated in an installed position in FIG. 4A. Removable member 306 may be in contact with second wall 314, first column 316, and second column 318 when in an installed position as illustrated in FIG. 4A.

With reference to FIG. 4B, an exploded view of fitting 202 is illustrated, in accordance with various embodiments. An xyz-axes is provided for ease of illustration. First column 316 may comprise an aperture (also referred to herein as first aperture) 432 through which first fastener 426 may extend to fasten removable member 306 to first column 316 and second wall 314. Second column 318 may comprise an aperture (also referred to herein as second aperture) 434 through which second fastener 428 may extend to fasten removable member 306 to second column 318 and second wall 314. Similarly, removable member 306 may be coupled to second wall 314 via first fastener 426 and via second fastener 428. Thus, removable member 306 may be removed from fitting 202 by removing first fastener 426 and second fastener 428. After removing removable member 306, link 256 (see FIG. 3) may be removed from pin 304. Thus, removal of removable member 306 and link 256 may be achieved from the distal, or radially outward, side of IFS 126 (see FIG. 3). Stated another way, removable member 306 may be removably accessible, or otherwise removable, from a radially outward side of IFS 126. In this manner, removable member 306 may be removed from fitting 202 without having to remove or otherwise reposition any portion of thermal layer 280 (see FIG. 2B), in accordance with various embodiments. Furthermore, removable member 306 may be removed from fitting 202 without having to open the thrust reverser or thrust reverser blocker door, in accordance with various embodiments. Stated another way, the removable member 306 may be removable from fitting 202 in response to a thrust reverser of the link arm 232 (see FIG. 2B) being in a closed position.

First fastener 426 and second fastener 428 may extend in the x-direction. Plurality of fasteners 322 may extend in the y-direction. Thus, plurality of fasteners 322 may extend in a direction which is orthogonal to the direction in which first fastener 426 and second fastener 428 extend.

With reference to FIG. 4C, a front view of fitting 202 is illustrated, in accordance with various embodiments. An xy-axes is provided for ease of illustration. A first end 442 of pin 304 may be coupled to first wall 312. In various embodiments, pin 304 and first wall 312 may comprise a single unitary member. Pin 304 may extend in a direction orthogonal to first wall 312 as shown in FIG. 4C. Pin 304 may comprise a centerline axis 484. As previously mentioned, removable member 306 may surround at least a portion of second end 444 of pin 304. Thus, removable member 306 may prevent link 256 (see FIG. 3) from moving along centerline axis 484, with respect to pin 304. Stated another way, removable member 306 may prevent link 256 (see FIG. 3) from moving in the x-direction.

With reference to FIG. 3 and FIG. 4C, link 256 may be located between first wall 312 and removable member 306 in response to link 256 and removable member 306 being in an installed position as illustrated in FIG. 3. First column 316 may be located between first wall 312 and second wall 314. Second column 318 (not shown in FIG. 4C) may be located between first wall 312 and second wall 314. Removable member 306 may be located between first column 316 and second wall 314. Removable member 306 may be located between second column 318 (not shown in FIG. 4C) and second wall 314.

In various embodiments, fitting 202 may comprise a steel alloy. In various embodiments, fitting 202 may comprise aluminum, a composite material, or any other suitable material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nacelle for a gas turbine engine comprising:
an inner fixed structure (IFS); and
a fitting for a link arm, the fitting being attached to a proximal surface of the IFS, the fitting comprising:
a base plate configured to be fastened to a proximal surface of the IFS,
a first supporting wall extending orthogonal from the base plate,
a second supporting wall extending orthogonal from the base plate,
a pin extending orthogonally from the first wall, wherein the link arm pivotally rotates about the pin,
a removable member for preventing the link arm from detaching from the pin, the removable member being removably accessible from a radially outward side of the IFS,
a first column located between the first wall and the second wall, and
a second column located between the first wall and the second wall,
wherein the removable member is attached to the second wall and the first column via a first removable member fastener, the removable member located between the second wall and the first column, and the removable member is attached to the second wall and the second column via a second removable member fastener, the removable member located between the second wall and the second column.

2. The nacelle of claim 1, wherein the fitting is attached to the proximal surface of the IFS via a plurality of fasteners.

3. The nacelle of claim 2, wherein the link arm comprises a thrust reverser link arm, the removable member being removable from the fitting in response to a thrust reverser being in a closed position.

4. The nacelle of claim 3, wherein the pin comprises a centerline axis, the removable member preventing the link arm from moving along the centerline axis with respect to the pin.

5. The nacelle of claim 4, wherein the pin is coupled to the first supporting wall.

6. The nacelle of claim 5, wherein the removable member is in contact with the second supporting wall in response to the removable member being in an installed position.

7. The nacelle of claim 5, wherein the link arm is located between the first supporting wall and the removable member in response to the link arm being in an installed position and the removable member being in the installed position.

8. The nacelle of claim 7, wherein the plurality of fasteners extend in a direction orthogonal to the first removable member fastener and the second removable member fastener.

9. A fitting for a thrust reverser link arm comprising:
a base plate configured to be fastened to a proximal surface of an inner fixed structure;
a first wall extending orthogonally from the base plate;
a pin extending orthogonally from the first wall;
a second wall extending orthogonally from the base plate;

a removable member;
a first column located between the first wall and the second wall; and
a second column located between the first wall and the second wall,
wherein the removable member is attached to the second wall and the first column via a first removable member fastener, the removable member located between the second wall and the first column, and the removable member is attached to the second wall and the second column via a second removable member fastener, the removable member located between the second wall and the second column.

10. The fitting of claim 9, wherein the removable member surrounds at least a portion of the pin in response to the removable member being in an installed position.

11. The fitting of claim 9, wherein a first aperture is disposed in the first column for receiving the first removable member fastener, and wherein a second aperture is disposed in the second column for receiving the second removable member fastener.

12. A nacelle arrangement comprising:
an inner fixed structure (IFS);
a thrust reverser blocker door;
a thrust reverser link arm coupled to the thrust reverser blocker door;
a fitting coupled to the thrust reverser link arm, the fitting being attached to a proximal surface of the IFS, the fitting comprising:
a base plate fastened to the proximal surface of the IFS;
a first wall extending orthogonally from the base plate in a distal direction;
a pin extending orthogonally from the first wall, the pin comprising a first end coupled to the first wall and a second end;
a second wall extending orthogonally from the base plate;
a removable member surrounding at least a portion of the second end of the pin,
a first column located between the first wall and the second wall, and
a second column located between the first wall and the second wall,
wherein the removable member is attached to the second wall and the first column via a first removable member fastener, the removable member located between the second wall and the first column, and the removable member is attached to the second wall and the second column via a second removable member fastener, the removable member located between the second wall and the second column,
the removable member configured to transfer a load from the pin into the IFS in response to the thrust reverser blocker door being deployed, the removable member being removable from a radially outward side of the IFS.

13. The nacelle arrangement of claim 12, wherein a first end of the thrust reverser link arm is rotatably coupled to the fitting and a second end of the thrust reverser link arm is coupled to the thrust reverser blocker door.

14. The nacelle arrangement of claim 13, wherein the removable member surrounds a distal/aft half of the pin.

15. The nacelle arrangement of claim 14, wherein at least a portion of the load is transferred from the thrust reverser link arm, into the pin, into at least one of the removable member and the first wall, into the base plate, and into the IFS.

* * * * *